United States Patent [19]

Wynosky et al.

[11] Patent Number: 4,864,820

[45] Date of Patent: Sep. 12, 1989

[54] EXHAUST NOZZLE

[75] Inventors: Thomas A. Wynosky, Madison; Michael J. Larkin, Rocky Hill; William E. Fortmann, Canton, all of Conn.

[73] Assignee: United Technologies Corporation, Hartford, Conn.

[21] Appl. No.: 111,397

[22] Filed: Oct. 22, 1987

[51] Int. Cl.⁴ .......................... F02K 1/40; F02K 11/00
[52] U.S. Cl. ..................................... 60/270.1; 60/271; 60/39.5
[58] Field of Search .................... 60/39.5, 226.1, 226.2, 60/226.3, 271, 263, 264; 416/93 R, 94

[56] References Cited

U.S. PATENT DOCUMENTS

| | | | |
|---|---|---|---|
| 2,526,409 | 10/1950 | Price | 60/226.1 |
| 2,526,941 | 10/1950 | Fishbein | 244/15 |
| 3,117,750 | 1/1964 | Snell | 244/23 |
| 3,802,187 | 4/1974 | Titus | 60/39.5 |
| 3,811,791 | 5/1974 | Cotton | 60/226.1 |
| 4,488,399 | 12/1984 | Robey et al. | 60/262 |
| 4,566,270 | 1/1986 | Ballard et al. | 60/271 |
| 4,569,199 | 2/1986 | Klees et al. | 60/226.1 |

FOREIGN PATENT DOCUMENTS 601170  5/1948  United Kingdom .

OTHER PUBLICATIONS

Aviation Week & Space Technology, Nov. 4, 1985, p. 41.

Primary Examiner—Louis J. Casaregola
Attorney, Agent, or Firm—Lloyd D. Doigan

[57] ABSTRACT

An exhaust nozzle extends from an engine nacelle and has an opening disposed at an acute angle such that the exhaust stream is blown over a length of the propeller blade. The opening has a plurality of guide vanes disposed therein to shape the exhaust stream most effectively. By spreading the exhaust stream over the length of a propeller, mixing of the exhaust stream with ambient air is maximized, thereby lowering the temperature of the exhaust stream to tolerable levels.

10 Claims, 4 Drawing Sheets

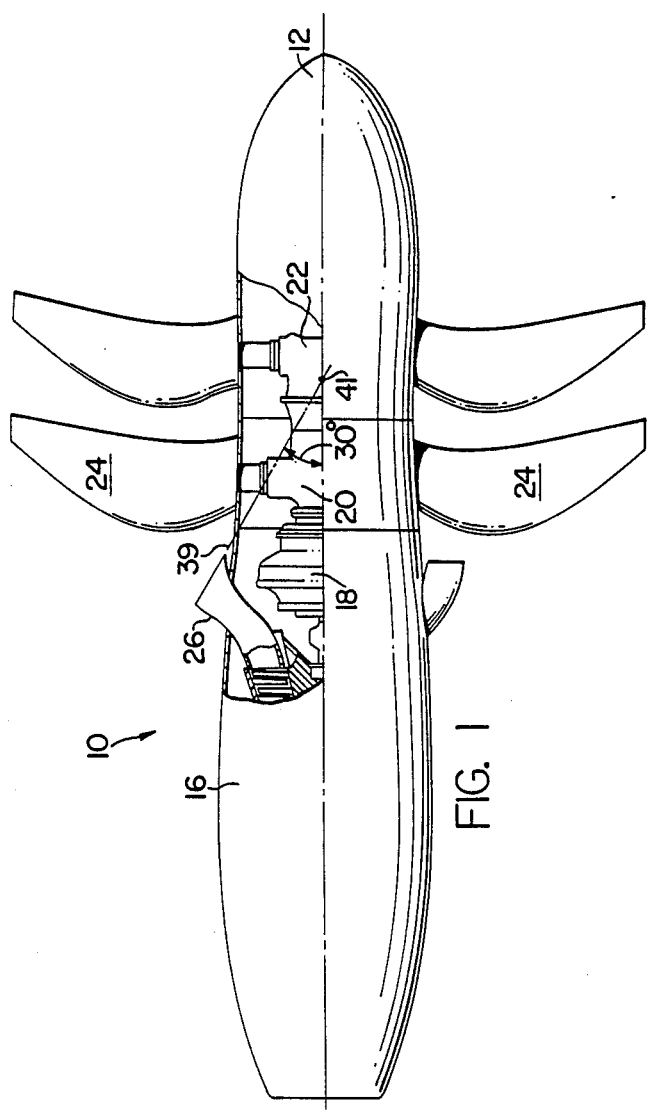

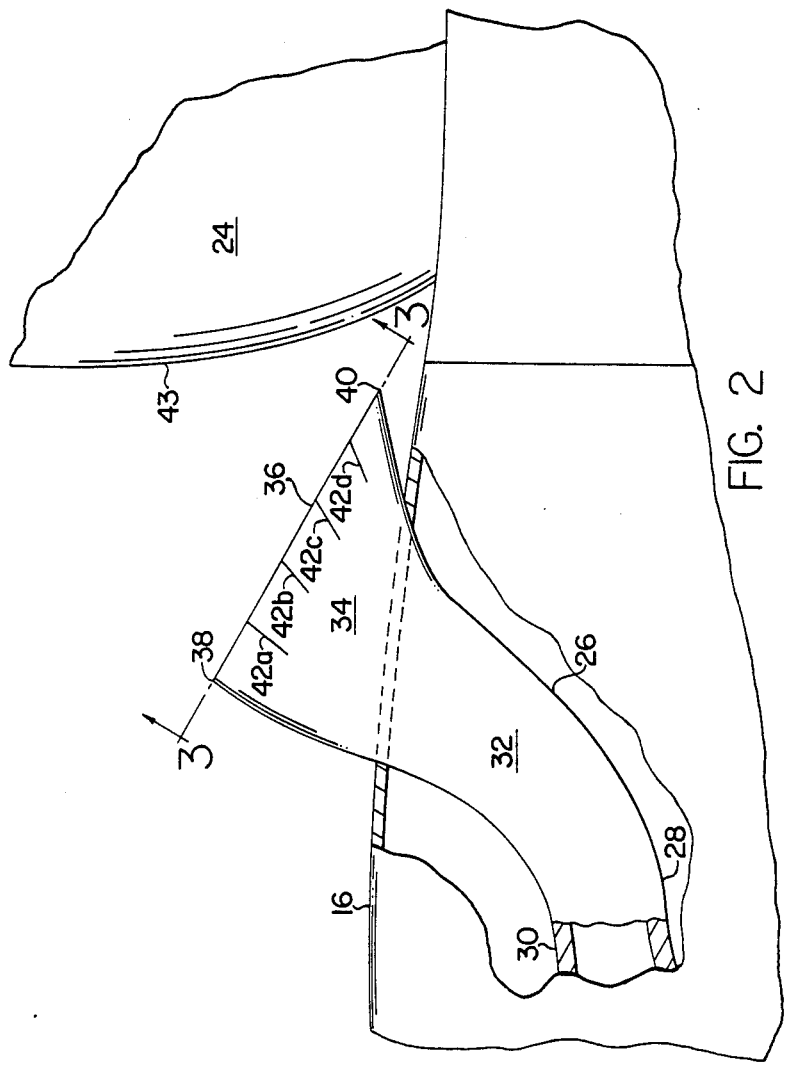

EXHAUST NOZZLE

DESCRIPTION

1. Technical Field

This invention relates to exhaust nozzles and more particularly for exhaust nozzles used in conjunction with pusher-type propulsion systems.

2. Background Art

Aircraft propulsion systems may include an engine, a nacelle, a hub, and a plurality of propeller blades. The engine, which is housed in the nacelle, rotates the hub in which the propeller blades are mounted. Pusher-type propulsion systems place the hub and propeller blades aft of the engine and nacelle. Because the propellers blades are mounted aft of the engine, the blades are subject to the hot exhaust stream of the engine. Generally, propeller blades have not been able to withstand the heat of the exhaust stream of gas turbine engines. Several solutions have been tried.

In British Patent Specification 586,557 the exhaust stream is directed through a root portion of the propeller blade. The ducting required for such a system adds a great dual of weight to the propulsion system. In British Patent Specification 601,170 two other solutions are disclosed. In one solution, a plurality of lobed nozzles which extend radially about an engine nacelle distribute the exhaust of the engine straight back across the propeller blades. The exhaust mixes with ambient air to lower the temperature of the exhaust to a point where the propeller blades can theoretically tolerate it. Note however that the propeller blades are mounted a good distance away from the nozzle. The apparatus required to mount the propellers so far aft of the exhaust nozzles adds a good deal of weight to a propulsion system. Moreover, the radial length of the nozzles adds weight and drag. The second solution ducts the engine exhaust stream outside the diameter of the propellers such that the hot exhaust stream does not interact with the propeller blades. As with the first solution, the radially extending ducts add weight and drag.

Accordingly, new types of protection for propeller blades are sought.

DISCLOSURE OF INVENTION

It is an object of the invention to provide a nozzle that minimizes the temperature of the exhaust stream impinging upon a propeller blade, and provides relatively low drag and weight.

According to the invention, an exhaust nozzle extends from an engine nacelle and has an opening disposed at an acute angle such that the exhaust stream is blown over a length of the propeller blade. The opening has a plurality of particularly angled guide vanes disposed therein to shape the exhaust stream most effectively. By spreading the exhaust stream over the length of the propeller, mixing of the exhaust stream with ambient air is maximized, thereby lowering the temperature of the exhaust stream to tolerate levels. The opening is particularly shaped to ensure that each point along the length of each blade is within the exhaust stream of each nozzle approximately the same amount of time.

According to a feature of the invention, the nozzle opening has a roughly teardrop shape.

According to a feature of the invention, by bathing a length of the propeller blades with exhaust, the need for propeller deicing is minimized.

These and other objects, features and advantages of the present invention will become more apparent in light of the detailed description of a best mode embodiment thereof, as illustrated in the accompanying drawing.

BRIEF DESCRIPTION OF DRAWING

FIG. 1 is a schematic cross sectional view of a propulsion system incorporating an embodiment of the nozzle of the invention;

FIG. 2 is an expanded view of the nozzle of FIG. 1;

FIG. 3 is a perspective cross-sectional view of the nozzle of FIG. 2 taken along the line 3—3;

BEST MODE FOR CARRYING OUT THE INVENTION

Figure 4:
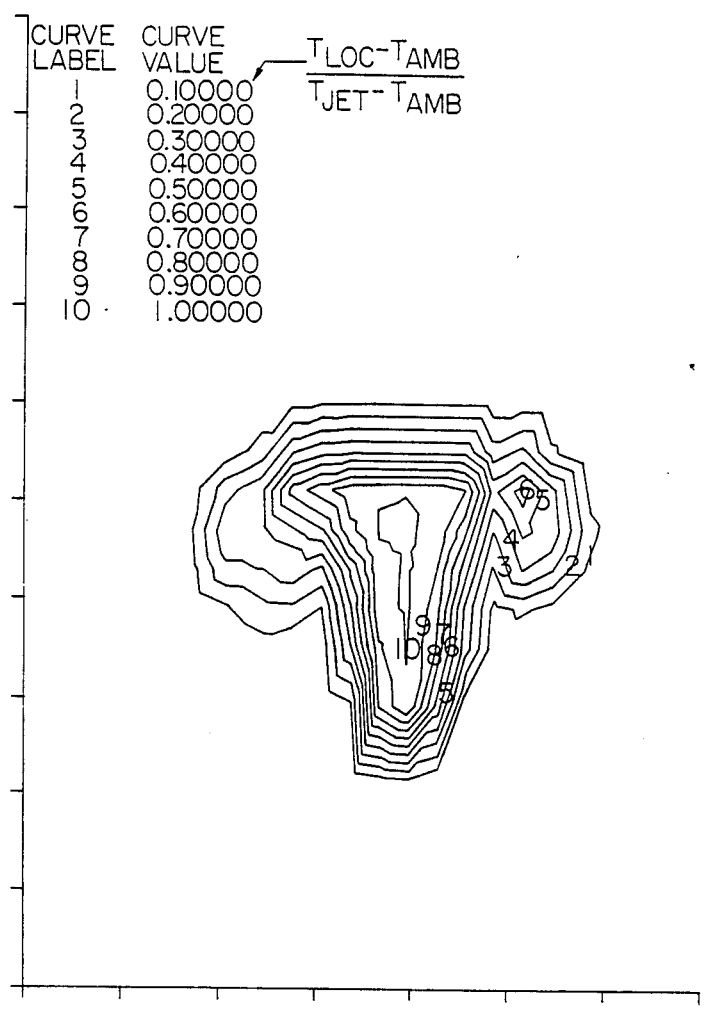
FIG. 4 is a graphical representation of the shape and temperature of the exhaust stream at the plane of the blades, the exhaust stream having passed through a nozzle without particularly angled vanes.

Referring to FIG. 1, an embodiment of a counter-rotating pusher-prop propulsion system 10 is shown. The propulsion system, which is disposed about an axial centerline 12, includes: a gas-turbine engine 14 housed within a nacelle 16, a gearbox 18, and two counter-rotating hubs 20, 22 in which a plurality of propeller blades 24 are mounted. The engine drives the hubs and the propellers thereby, in a counter-rotating manner through the gearbox as is well known in the art.

The exhaust stream of the engine, which may be approximately 1200° F., is collected by a plurality of nozzles 26 which are spaced about the nacelle.

Referring to FIG. 2, each nozzle 26 attaches at a first portion 28 to a turbine exit guide vane 30, has a second portion 32 which turns outwardly at a roughly 45° angle and passes through the nacelle, and a third portion 34 which curves back towards parallel to the centerline 12.

The third portion terminates in an opening 36. The opening has an upstream edge 38 which extends about ten inches from the nacelle and a downstream edge 40 which extends about 2½ inches from the nacelle 16. The upstream edge and downstream edge are connected by a plane 39 which extends from a point 41 (see FIG. 1) on the centerline 12 downstream from the opening at an acute angle of about 30°. The downstream edge is about four inches from a leading edge 43 of a propeller blade 24. The upstream edge of the opening is about 17 inches from the leading edge of the propeller blade.

The upstream edge 38 of the opening 36 is disposed at an angle of approximately 60° to the axial centerline 12. The downstream edge is disposed at an angle of approximately 15° to the axial centerline. Four vanes 42(a-d) are disposed across the opening to direct the exhaust stream out of the opening. The vanes are disposed symmetrically between the 60° angle of the upstream edge and the 15° angle of the downstream edge; vane 42a is disposed at about 51° to the axial centerline, vane 42b at about 42°, vane 42c at about 33°, and vane 42d at about 24°. The vanes shape the exhaust stream, as will be discussed infra, and recover some of the thrust lost because the exhaust stream is not directed parallel to the axial centerline. The angle and number of vanes depends, as would be obvious to one of ordinary skill in the art, on the angle of the plane 39, the velocity and temperature of the exhaust, and the distance of the blade from the nozzle.

Referring to FIG. 3, the opening of the nozzle is shown. The opening has a roughly teardrop shape. The teardrop shape helps ensure that each point along the length of each blade is within the exhaust stream of each nozzle approximately the same amount of time so that uneven heating (by the exhaust) and cooling (by ambient air between the nozzles) of each blade is not encountered. Radially inner points along the blade move more slowly angularly than radially outer points. As such, the teardrop shape helps ensure that the angularly slowly moving points along the blade move through a relatively narrow exhaust stream band and that the angularly faster moving points along the blade move through a relatively wide exhaust stream band. The upstream portion 38 of the opening is roughly parabolic thereby forming an aerodynamic shape which reduces noise and drag.

The angled vanes, the upstream edge, and the downstream edge further ensure even heating and cooling by shaping the exhaust stream. If particularly angled vanes are not used to direct the exhaust stream outwardly, the relatively cold and heavy ambient air tends to flatten the exhaust stream as it approaches the blades. FIG. 4, a temperature profile of the exhaust stream through which each blade passes, shows such a flattened exhaust stream. The curves of FIG. 4 are a function of: (Temperature at the blade ($T_{LOC}$)—ambient temperature ($T_{AMB}$)/(Temperature of the exhaust ($T_{JET}$)—$T_{AMB}$). A label value of 10 indicates the highest temperature and a value of 1 indicates the lowest temperature above ambient. Note the very large 10 area and wide exhaust stream distribution. Such a distribution may lead to uneven heating and cooling which may damage the blade.

Figure 5:
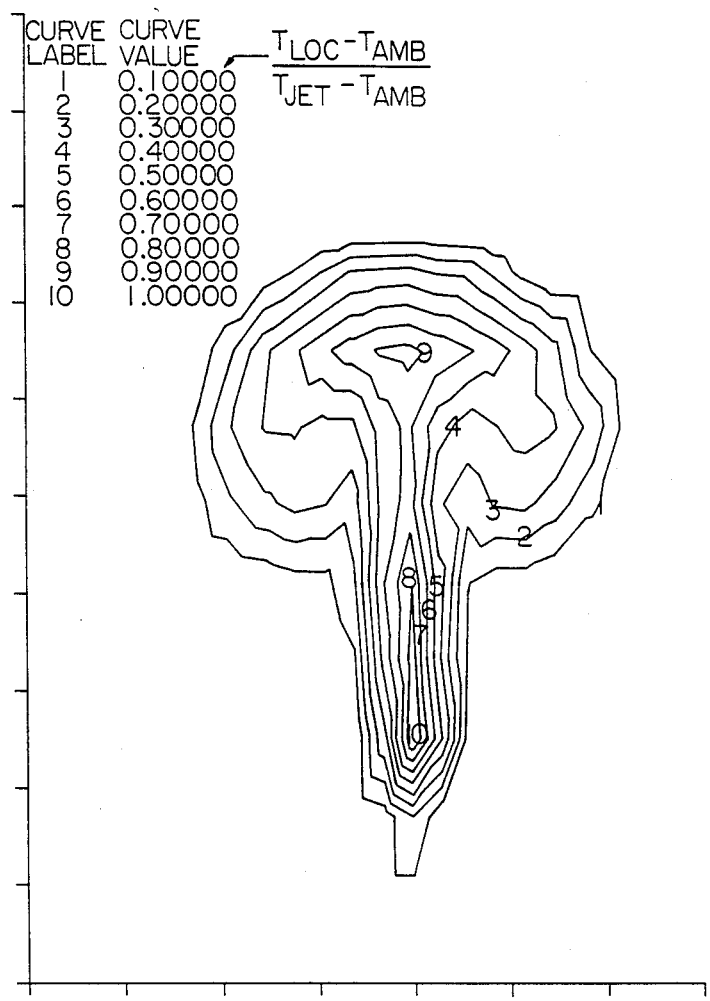
FIG. 5 is a graphical representation of the shape and temperature of the exhaust stream at the plane of the blades, the exhaust stream having passed through the nozzle of FIG. 2.

FIG. 5 shows the distribution of the exhaust which passes through particularly angled vanes 42(a-d). Note that flattening is minimized and that the highest temperatures, label values 9 and 10 are all but eliminated.

The nozzle provides a low profile which minimizes drag and weight. The angle of dispersement may reduce the temperature of the exhaust impinging upon the blades to as low as 260° F., a temperature which aluminum spar blades may tolerate.

One of ordinary skill in the art would appreciate that the distance of the nozzle from the blade and the angle formed relative to the centerline by the opening of the nozzle and the vanes in the nozzle opening depends on the different requirements of each application. Different exhaust stream velocities, different vibrational frequencies of the blade, different exhaust temperatures and different noise requirements all mandate variations in angle and closeness.

Although the invention has been shown and described with respect to a best mode embodiment thereof, it should be understood by those skilled in the art that the foregoing and various other changes, omissions, and addition in the form and detail thereof may be made therein without departing from the spirit and scope of the invention.

We claim:

1. Apparatus for directing the exhaust stream of a propeller system, said propeller system being disposed about an axial centerline and having a gas turbine engine, a nacelle surrounding said engine, and a plurality of propeller blades, said blades being mounted aft of and driven by said engine, said apparatus characterized by
   a nozzle for receiving the exhaust stream from said engine and extending through said nacelle upstream of said propellers expelling said exhaust stream into the atmosphere and bathing said propeller blades therewith, said nozzle having an opening defined by a plane extending at an acute angle from a point on said centerline downstream of said nozzle such that said exhaust stream is spread across a length of said propeller blades; and
   means disposed within said opening for shaping said exhaust stream expelled from said nozzle such that said propeller blades are protected from the temperature of said exhaust stream.

2. The apparatus of claim 1 wherein said nozzle is further characterized as having a roughly teardrop shaped opening having a smaller width radially closer to said centerline and a larger width radially further from said centerline such that points along a length of each of said propeller blades spend approximately the same amount of time within said exhaust stream as said propeller blades rotate.

3. The apparatus of claim 1 further characterized by said nozzle having an upstream edge disposed at an acute angle to a point on said centerline upstream of said nozzle and a downstream edge disposed at a lesser acute angle to said point on said centerline upstream of said nozzle than said upstream edge and by said means disposed within said opening being characterized by a plurality of vanes.

4. The apparatus of claim 3 further characterized by each of said vanes being disposed at consecutively smaller angles from said upstream edge to said downstream edge from said point upstream of said nozzle.

5. Apparatus for directing the exhaust stream of a propeller system, said propeller system being disposed about an axial centerline and having a gas turbine engine, a nacelle surrounding said engine, and a plurality of propeller blades, said blades being mounted aft of and driven by said engine, said apparatus characterized by
   a nozzle for receiving the exhaust stream from said engine and extending through said nacelle upstream of said propellers expelling said exhaust stream into the atmosphere and bathing said propeller blades therewith, said nozzle having an opening defined by a plane extending at an acute angle from a point on said centerline downstream of said nozzle such that said exhaust stream is spread across a length of said propeller blades, said nozzle having a roughly teardrop shaped opening having a smaller width radially closer to said centerline and a larger width radially farther from said centerline such that points along a length of each of said propeller blades spend approximately the same amount of time within said exhaust stream as said propeller blades rotate; and
   means disposed within said opening for shaping said exhaust stream expelled from said nozzle such that said propeller blades are protected from the temperature of said exhaust stream.

6. Apparatus for directing the exhaust stream of a propeller system, said propeller system being disposed about an axial centerline and having a gas turbine engine, a nacelle surrounding said engine, and a plurality of propeller blades, said blades being mounted aft of and driven by said engine, said apparatus characterized by:

a nozzle for receiving the exhaust stream from said engine and extending through said nacelle upstream of said propellers expelling said exhaust stream into the atmosphere and bathing said propeller blades therewith, said nozzle having an opening defined by a plane extending at an acute angle from a point on said centerline downstream of said nozzle such that said exhaust stream is spread across a length of said propeller blades, said nozzle further having an upstream edge disposed at an acute angle from a point on said centerline upstream of said nozzle and a downstream edge disposed at a lesser acute angle from said point upstream of said centerline than said upstream edge; and a plurality of vanes disposed within said opening for shaping said exhaust stream expelled from said nozzle such that said propeller blades are protected from the temperature of said exhaust stream.

7. The apparatus of claim 6 further characterized by each of said vanes being disposed at consecutively smaller acute angles from a point on said centerline upstream of said nozzle from said upstream edge to said downstream edge.

8. Apparatus for directing the exhaust stream of a propeller stream, said propeller system being disposed about an axial centerline and having an engine, a nacelle surrounding said engine, and a plurality of propeller blades, said blades being mounted aft of and driven by said engine, said apparatus characterized by a nozzle for receiving the exhaust stream from said engine and extending through said nacelle upstream of said propellers expelling said exhaust stream into the atmosphere and bathing said propeller blades therewith, said nozzle having an opening defined by a plane extending at an acute angle from a point on said centerline downstream of said nozzle such that said exhaust stream is spread across a length of said propeller blades, said nozzle having a roughly teardrop shaped opening having a smaller width radially closer to said centerline and a larger width radially farther from said centerline such that points along a length of each of said propeller blades spend approximately the same amount of time within said exhaust stream as said propeller blades rotate.

9. Apparatus for directing the exhaust stream of a propeller system, said propeller system being disposed about an axial centerline and having an engine, a nacelle surrounding said engine, and a plurality of propeller blades, said blades being mounted aft of and driven by said engine, said apparatus characterized by a nozzle for receiving the exhaust stream from said engine and extending through said nacelle upstream of said propellers expelling said exhaust stream into the atmosphere and bathing said propeller blades therewith, said nozzle having a roughly teardrop shaped opening having a smaller width radially closer to said centerline and a larger width radially farther from said centerline such that points along a length of each of said propeller blades spend approximately the same amount of time within said exhaust stream as said propeller blades rotate.

10. Apparatus for directing the exhaust stream of a propeller system, said propeller system being disposed about an axial centerline and having an engine, a nacelle surrounding said engine, and a plurality of propeller blades, said blades being mounted aft of and driven by said engine, said apparatus characterized by a nozzle for receiving the exhaust stream from said engine and extending through said nacelle upstream of said propellers expelling said exhaust stream into the atmosphere and bathing said propeller blades therewith, said nozzle being shaped such that points along a length of each of said propeller blades spend approximately the same amount of time within said exhaust stream as said propeller blades rotate.

* * * * *